INVENTOR
HUGO BENDER

United States Patent Office 3,581,338
Patented June 1, 1971

3,581,338
APPARATUS FOR SHIRRING ARTIFICIAL SAUSAGE CASINGS
Hugo Bender, Wiesbaden-Erbenheim, Germany, assignor to Kalle Aktiengesellschaft, Wiesbaden, Biebrich, Germany
Filed Dec. 26, 1968, Ser. No. 786,993
Claims priority, application Germany, Dec. 27, 1967,
P 16 32 115.6
Int. Cl. A22c *13/00*
U.S. Cl. 17—42                                        5 Claims

ABSTRACT OF THE DISCLOSURE

This invention relates to an apparatus for shirring sausage casings which comprises a mandrel, a movable abutment adapted to be contacted by the end of a shirred casing, and a plurality of rotatable conveyor wheel means having grooved rims mounted adjacent the mandrel and being adapted to engage a sausage casing, the grooved rims being divided into a plurality of segments of different coefficients of friction and segments having said different coefficients being opposite each other where the sausage casing is engaged by the grooved rims.

---

Figure 1:
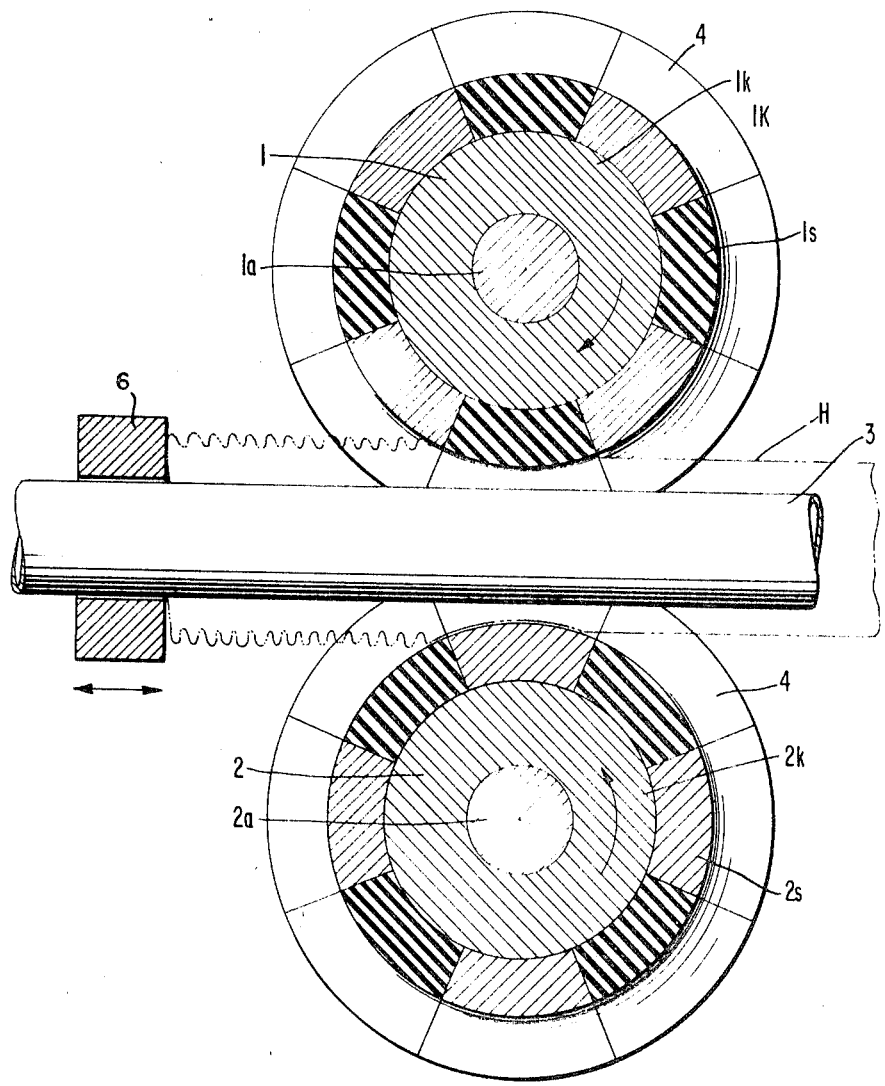

Artificial sausage casings, in particular those of regenerated cellulose, are frequently given a shirred shape, because they can be more easily handled when deformed in this manner.

Most of the known apparatuses for shirring artificial sausage casings are provided with a hollow mandrel with conveyor means arranged around the mandrel and with an abutment whose distance from the conveyor means is variable. For shirring, the sausage casings are transported in the longitudinal direction by the conveyor means, drawn onto a section of the mandrel and from there, after having passed the conveyor means, pushed onto an adjacent section of the mandrel, until the transport is ended, with pleating of the sausage casing, either by the abutment or by the already pleated lengths of casing piled up in front of the abutment. This pleating of the sausage casings with simultaneous reduction of length, which takes place under relatively heavy pressure, is designated in the following as "shirring."

Since the quantity of shirred sausage casing piling up before the abutment increases steadily during the shirring operation, the abutment is allowed to move back from the conveyor means during shirring at the rate at which the quantity of shirred sausage casing piled up in front of the abutment increases in length. As soon as the shirred sausage casing has reached the desired length, the shirring operation is interrupted to allow the shirred portion of the sausage casing to be cut off from the remainder of the sausage casing and for the shirring mandrel loaded with shirred sausage casing to be freed therefrom or to be replaced by an empty shirring mandrel. Before shirring is resumed, the abutment surface is returned to its initial position nearer the conveyor means. These two possible movements of the abutment, i.e. its movement away from the conveyor means during shirring and its return to the initial position thereof, are meant when stating, in this context, that the distance of the abutmen from he conveyor means is variable.

During shirring of the sausage casing, air is blown, under a pressure which is slightly above atmospheric pressure, through the hollow mandrel and into the interior of the sausage casing, so that the casing is inflated to its full size while it is being drawn and pushed over the shirring mandrel and shirred. The inflated section of the sausage casing may be bounded, e.g., on one side by the abutment and on the other side by a pair of squeeze rolls which pinch the sausage casing before it reaches the shirring mandrel. However, the inflated section of the sausage casing also may be enclosed in any other suitable manner. Also, it is not necessary for the boundary points to cause a perfectly air-tight closure of the sausage casing, since the slight superatmospheric pressure required can be maintained by a continuous blowing in of air. Therefore, the boundary means are not described in the present application. Their construction is no part of the invention described in this application.

In order to effect shirring in a technically advantageous manner, it has been suggested to use two or more endless revolving rows of shirring cogs as conveyor means which cause the shirring of the sausage casings by compression on the mandrel, part of each revolving row of shirring cogs conveying the sausage casing by engaging the latter with the cogs with partial compression of the casing while being moved in the direction of feed of the sausage casing. The rows of cogs are mounted around the mandrel at equally spaced distances, i.e. in the case of two rows they are positioned on opposite sides of the casing, in the case of three rows they are spaced around the central axis of the mandrel at angles of 120°, and so on.

In an early embodiment of the just described known type of shirring machines, two rows of shirring cogs were used. The cogs were spaced a relatively large distance from each other, as compared with the diameter of the sausage casing, and engaged the sausage casing simultaneously from opposite positions on the circumference of the latter. In a more recent, improved version of the shirring apparatus of this type, two or more rows of shirring cogs acting on the sausage casing with deformation thereof were mounted around the mandrel in such a manner that the distance between successive shirring cogs corresponded approximately to the length of the shirring cogs, measured in the longitudinal direction of the sausage casing, and the shirring cogs of one row were staggered with regard to the shirring cogs of the other row, so that the sausage casing was never simultaneously engaged by shirring cogs on opposite sides of its circumference, and caused to move in the longitudinal direction.

In other known shirring apparatuses, the conveyor means consist of two wheels with grooved rims which are mounted at opposite positions in such a manner that the sausage casing is continuously clamped between them and is continuously advanced by the two wheels which rotate in opposite directions. For improved pleat formation, the wheels perform a reciprocating or otherwise periodic movement in relation to the mandrel.

The above described shirring apparatuses of known type are of a relatively complex construction.

The present invention provides a shirring apparatus which can be built relatively easily, but nevertheless has a good shirring action, so that sausage casings shirred with this device form a stick of relatively high bending resistance.

The present invention is based on a known machine for shirring artificial sausage casings in which two or more conveyor wheels with rims grooved in accordance with the diameter of the sausage casing are mounted around a stationary hollow mandrel with their axes at right angles to the mandrel and in which an abutment surface is positioned at a variable distance from the conveyor wheels. The grooved rims of the conveyor wheels are subdivided into segments some of which have in their grooves a surface with a higher coefficient of friction than the others. During rotation of the conveyor wheels, one segment of each conveyor wheel arrives simultaneously at the point of the narrowest passage between the wheels and, of the segments arriving there simultaneously, only one has a surface with a higher coefficient of friction in its groove than the other segment or segments. Preferably, for each conveyor wheel, the number of segments on the rim is a multiple of the number n of the conveyor wheels, with one of n successive segments of each conveyor wheel being a segment with a surface of higher coefficient of friction. The difference in the coefficient of friction between the individual segments may be caused by a different surface treatment, which means that segments with polished surfaces and segments with unpolished or mechanically roughened surfaces may alternate, or the segments may consist of one of two different materials, thus causing different coefficients of friction.

The apparatus is provided with two or more conveyor wheels mounted at equal spaced distances around the mandrel, which simultaneously retain the sausage casing clamped between them during operation of the machine and cooperate to give it an advancing movement, by means of which the sausage casing is drawn or pushed onto the mandrel in the manner described above and simultaneously shirred. The essential feature of the machine is the subdivision of the grooved rims of the conveyor wheels into segments with surfaces of different characteristics in the grooves.

In its simplest embodiment, the machine is equipped with two conveyor wheels positioned on opposite sides of the mandrel. In this case, each of the conveyor wheels is advantageously subdivided into an even number of rim segments. When reaching the point of the narrowest passage between the two conveyor wheels during their rotation, in each case one segment having a surface with a higher coefficient of friction is confronted with a surface having a lower coefficient of friction.

In the case of a machine provided with three shirring wheels, these are mounted around the shirring mandrel at angles of 120°. Advantageously, each conveyor wheel is subdivided into a number of rim segments which is divisible by three. During rotation of the conveyor wheels, one segment of each conveyor wheel, i.e. three segments in all, reach the point of the narrowest passage between the three conveyor wheels simultaneously, but only one of the three segments simultaneously arriving has a surface of a higher coefficient of friction. In a machine having three conveyor wheels, one segment with a surface of a high coefficient of friction may be followed in the rims of the conveyor wheels by two segments having a surface with a different frictional value, but other sequences may be employed without departing from the scope of the present invention.

For machines provided with four or more conveyor wheels, the mounting of the conveyor wheels around the mandrel and the subdivision of the rims of the wheels into segments with surfaces of different coefficients of friction can be deduced analogously from the foregoing.

As mentioned above, the difference in the friction of the surfaces of the segments may be caused by a different treatment of the surfaces or by fabricating the segments from different materials. Thus, one kind of segment may be made, e.g., of metal with a polished and chrome plated surface, and the other kind of segment of hard rubber, plastic materials resembling hard rubber, unplasticized polyvinyl chloride, or similar synthetic materials.

The effect of the machine is based on the regular periodic displacement of the pleats from the side of the sausage casing facing one conveyor wheel to a side facing another conveyor wheel. This displacement of the shirring pleats results in a relatively narrow arrangement of the pleats, so that the shirred sausage casing forms a stick of a relatively high bending resistance. This effect of the machine is very surprising because the sausage casing is synchronously advanced by the conveyor wheels on all sides where conveyor wheels are mounted. However, it was observed that, after passage of the conveyor wheels, the sausage casing was deflected in each case in the direction of the conveyor wheel, facing the passage between the conveyor wheels, with a surface of a higher coefficient of friction. Obviously, the higher coefficient of friction causes the sausage casing to adhere somewhat longer to the segment with the groove of the higher frictional value, so that it undergoes a deflection from its straight forward motion after the conveying impulse has been imparted to it.

The type of pleat formation is determined mainly by the length of the segments, measured in the peripheral direction of the rim of the conveyor wheel. Further, the size of the shirring wheels, the differences in the coefficients of friction between the sausage casing and the surface of higher coefficient of friction, on the one hand, and the sausage casing and the surface of lower coefficient of friction, on the other hand, and the number of shirring wheels influence the pleat formation. Normally, favorable results are obtained when the distance between segments with surfaces of a higher coefficient of friction, measured from the center of one segment to the center of the other segment at the deepest point of the groove, is between 2 cm. and 10 cm. For example, a sausage casing having a diameter of 24 mm. (when inflated) was successfully shirred with a two-wheeled machine the conveyor wheels of which had an outer diameter of 125 mm. and a rim which was subdivided into 12 segments. The segments had a groove 6 mm. deep and consisted alternately of steel and a plastic material resembling hard rubber.

The machine of the present invention has the advantage that it has a very simple construction, so that it can be easily built and exhibits a relatively low susceptibility to malfunction.

Figure 2:
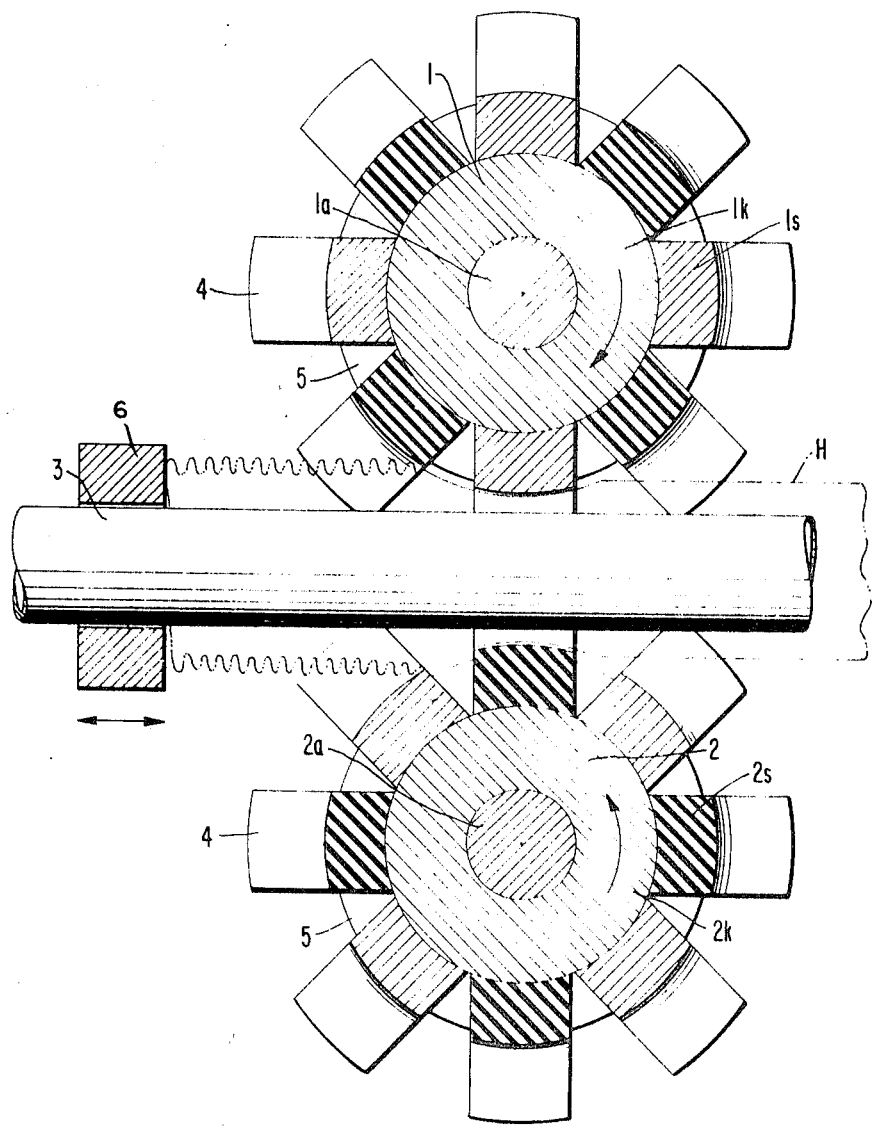
Figure 3:
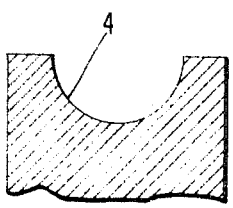

The invention will be further illustrated in detail by reference to FIGS. 1 to 3 representing, in cross-section, the essential features of two embodiments of the shirring machine according to the invention.

As conveyor means, the machines shown in the drawings are provided with two conveyor wheels 1 and 2 the axes of which are stationary relative to a shirring mandrel 3 and can be rotated, by means of a mechanism not shown, in opposite directions, as indicated by the arrows. The conveyor wheels 1 and 2 are both provided at their rims with grooves 4 of such a shape that, at a suitable distance of the two conveyor wheels from each other, the sausage casing H to be shirred is clamped between the grooves 4 in such a manner that, although a deformation of its profile can not be detected with the naked eye or is so slight that both conveyor wheels together reduce its diameter by not more than 10%, the casing is held so tightly that the conveyor wheels 1 and 2 advance it during their rotation without any slippage between the conveyor wheels 1 and 2 and the sausage casing H.

The mandrel is mounted centrally between the conveyor wheels 1 and 2. It is hollow so that air can be blown into the sausage casing.

In the embodiment shown in FIG. 1, the conveyor wheels 1 and 2 rotate about the axes 1a and 2a which are at right angles to the mandrel 3. The wheel bodies 1k and 2k are mounted on the axes and, on the wheel bodies are the rims composed of the individual segments 1s and 2s. In the embodiment shown, there are 8 segments, but this is intended only as an example. In most cases, it will be more advantageous to use a machine in which the rims of the wheels are subdivided into 12 or more segments. The individual segments consist alternately of one or the other of two materials, thus providing surfaces of differing coefficients of friction relative to the surface of the sausage casing. The difference in the materials is indicated by different hatching in the drawings. At the point of the narrowest passage between the conveyor wheels 1 and 2, a segment of the conveyor wheel 1 consisting of one of the two materials faces a segment of the conveyor wheel 2 made of the other material. During operation of the machine, rotation of the wheels causes a continuously alternating confrontation of two segments made of different materials.

FIG. 3 shows a cross-section through a segment displaying the groove in the rim of the conveyor wheel.

Whereas in the embodiment of the invention shown in FIG. 1, the individual segments 1s and 2s follow each other without interval, thus forming an uninterrupted rim, FIG. 2 shows an embodiment in which the individual segments 1s and 2s are mounted on the wheel bodies 1k and 2k at a distance from one another, spacing members 5 being mounted between the segments for easier spacing and better fastening of the segments to the wheel bodies. In this embodiment, the grooved rim of the wheels is interrupted each time between the individual segments. Otherwise, the statements made above with reference to the embodiment shown in FIG. 1 can be applied analogously to the embodiment shown in FIG. 2. In the embodiments of FIGS. 1 and 2, the sausage casing H is shirred against the movable abutment 6.

It will be obvious to those skilled in the art that many modifications may be made within the scope of the present invention without departing from the spirit thereof, and the invention includes all such modifications.

What is claimed is:

1. An apparatus for shirring sausage casings which comprises a mandrel, a movable abutment adapted to be contacted by the end of a shirred casing, and a plurality of rotatable conveyor wheel means having grooved rims mounted adjacent the mandrel and being adapted to engage a sausage casing, the grooved rims being divided into a plurality of segments of different coefficients of friction and segments having said different coefficients being opposite each other where the sausage casing is engaged by the grooved rims.

2. An apparatus according to claim 1 including two conveyor wheel means mounted in opposed relation relative to the mandrel.

3. An apparatus according to claim 1 in which the number of rim segments is a multiple of the number $n$ of the conveyor wheels and, of $n$ successive segments of each conveyor wheel, one segment has a surface of a higher coefficient of friction than the other.

4. An apparatus according to claim 1 in which the segments are alternately made of different materials.

5. An apparatus according to claim 1 in which the segments are spaced from each other.

References Cited

UNITED STATES PATENTS

| | | | |
|---|---|---|---|
| 2,983,949 | 5/1961 | Matecki | 17—42 |
| 3,231,932 | 2/1966 | Michl | 17—42 |

HUGH R. CHAMBLEE, Primary Examiner